US010725639B1

(12) United States Patent
Ponce de Leon et al.

(10) Patent No.: US 10,725,639 B1
(45) Date of Patent: Jul. 28, 2020

(54) PROJECT SCHEDULE DISPLAY WITH GRAPHICAL TARGET OVERLAY

(71) Applicant: PMA Technologies, LLC, Ann Arbor, MI (US)

(72) Inventors: Gui Ponce de Leon, Ann Arbor, MI (US); Seve Ponce de Leon, Ann Arbor, MI (US); Sergio Ponce de Leon, Ann Arbor, CT (US)

(73) Assignee: PMA TECHNOLOIGES, LLC, Ann Arbor, MI (US)

( * ) Notice: Subject to any disclaimer, the term of this patent is extended or adjusted under 35 U.S.C. 154(b) by 954 days.

(21) Appl. No.: 14/998,522

(22) Filed: Jan. 13, 2016

Related U.S. Application Data

(60) Provisional application No. 62/103,534, filed on Jan. 14, 2015.

(51) Int. Cl.
*G06F 3/0484* (2013.01)
*G06T 11/20* (2006.01)
*G06F 3/0482* (2013.01)

(52) U.S. Cl.
CPC ........ *G06F 3/04847* (2013.01); *G06F 3/0482* (2013.01); *G06F 3/04842* (2013.01); *G06F 3/04845* (2013.01); *G06T 11/206* (2013.01)

(58) Field of Classification Search
CPC ............... G06Q 10/06; G06Q 10/0631; G06Q 10/06312; Y10S 715/963; G06F 3/04847; G06F 3/04842; G06F 3/04845; G06F 3/0482; G06T 11/206
See application file for complete search history.

(56) References Cited

U.S. PATENT DOCUMENTS

| | | | | |
|---|---|---|---|---|
| 4,700,318 A | * | 10/1987 | Ockman | G06Q 10/06 345/595 |
| 5,231,567 A | * | 7/1993 | Matoba | G05B 19/41865 700/100 |
| 7,904,324 B2 | * | 3/2011 | Gura | G06Q 10/06311 705/7.23 |
| 8,249,906 B2 | * | 8/2012 | Ponce de Leon | G06Q 10/06 705/28 |
| 8,400,467 B1 | * | 3/2013 | Ponce de Leon | G06Q 10/06316 345/619 |
| 8,402,480 B2 | * | 3/2013 | Rohwer | G06Q 10/06 719/328 |

(Continued)

*Primary Examiner* — Andrew L Tank
(74) *Attorney, Agent, or Firm* — Carlson, Gaskey & Olds, P.C.

(57) ABSTRACT

A method for interactively transforming a schedule display includes displaying a baseline schedule on a canvas with a target schedule as a graphical overlay, wherein the networked schedule objects are displayed according to one of a plurality of different display formats that are indicative of whether the objects are in a behind-schedule status. On the graphical overlay, a time position is shifted, or duration of at least one of the networked schedule objects of the baseline schedule is changed, such that at least one of the objects that was previously in the behind-schedule status is now in an ahead-of-schedule status or an on-schedule status. In response to the shift of the time position or change in duration, the display format of the objects that are impacted is changed with respect to whether the objects are in the behind-schedule status.

11 Claims, 17 Drawing Sheets
(16 of 17 Drawing Sheet(s) Filed in Color)

(56) References Cited

U.S. PATENT DOCUMENTS

| | | | |
|---|---|---|---|
| 8,531,459 B1* | 9/2013 | Ponce de Leon | G06Q 10/00 345/440 |
| 2005/0151739 A1* | 7/2005 | Barrett | G06Q 10/06 345/440.2 |
| 2005/0160084 A1* | 7/2005 | Barrett | G06Q 10/06 |
| 2005/0222881 A1* | 10/2005 | Booker | G06Q 10/0631 14 705/7.15 |
| 2006/0200372 A1* | 9/2006 | O'Cull | G06Q 10/06 705/7.22 |
| 2006/0212323 A1* | 9/2006 | Ninomiya | G06Q 10/06312 705/7.22 |
| 2007/0245300 A1* | 10/2007 | Chan | G06Q 10/06 717/105 |
| 2009/0216602 A1* | 8/2009 | Henderson | G06Q 10/00 705/7.41 |
| 2010/0251247 A1* | 9/2010 | Pedersen | G06Q 10/06 718/102 |
| 2011/0301995 A1* | 12/2011 | Fukuda | G06Q 10/06 705/7.16 |
| 2012/0253891 A1* | 10/2012 | Hayes | G06Q 10/06 705/7.39 |
| 2012/0290347 A1* | 11/2012 | Elazouni | G06Q 10/00 705/7.12 |
| 2014/0173491 A1* | 6/2014 | Kawakubo | G06Q 10/06 715/772 |
| 2015/0339619 A1* | 11/2015 | Dumont | G06Q 10/0631 16 705/7.16 |

\* cited by examiner

PROJECT SCHEDULE DISPLAY WITH GRAPHICAL TARGET OVERLAY

REFERENCE TO RELATED APPLICATIONS

This application claims priority to U.S. Provisional Application No. 62/103,534, filed on Jan. 14, 2015.

COPYRIGHT NOTICE

Portions of this disclosure contain or may contain material that is subject to copyright protection. The copyright owner has no objection to the reproduction of the patent document of the patent disclosure as it appears in the Patent and Trademark Office patent file or records, but reserves all copyright rights whatsoever. Copyright 2016, PMA Technologies, LLC.

BACKGROUND

One typical approach in scheduling is known as the critical path method ("CPM"). In CPM, following any input for any activity, logic tie, or milestone, the CPM application executes a forward pass (early dates calculation) and a backward pass (late dates calculation) for the entire network schedule as a preceding, separate step to obtaining an output display of the schedule. The output of the schedule is generated on request, as a Gantt chart that lists activities and milestones on the vertical axis (left side of the display) versus a time scale of activity durations on their start and finish dates as horizontal bars (right side of the display) resulting in a "waterfall chart," as illustrated in FIG. 1. A change to the schedule in the CPM application requires another complete iteration of the forward and backward passes for the entire network, which is one factor that makes CPM applications characteristically inefficient in kinetically refreshing a display of the schedule in real-time to provide immediate user feedback of how the change impacts the schedule.

SUMMARY

A method for interactively transforming a schedule display according to an example of the present disclosure includes displaying a baseline schedule on a canvas with a target schedule as a graphical overlay, wherein the networked schedule objects are displayed according to one of a plurality of different display formats that are indicative of whether the objects are in a behind-schedule status. On the graphical overlay, a time position is shifted, or duration of at least one of the networked schedule objects of the baseline schedule is changed, such that at least one of the objects that was previously in the behind-schedule status is now in an ahead-of-schedule status or an on-schedule status. In response to the shift of the time position or change in duration, the display format of the objects that are impacted is changed with respect to whether the objects are in the behind-schedule status.

A method for interactively transforming a schedule display according to another example of the present disclosure includes: providing a baseline schedule of networked schedule objects and a related target schedule, wherein each of the baseline schedule and the target schedule has schedule attributes that include at least one of start date, finish date, duration, drift, float, or total float; selecting one or more filter criteria and comparing one or more of the schedule attribute variances between the baseline schedule and the target schedule against the one or more filter criteria; displaying the baseline schedule on a canvas with the target schedule as a graphical overlay, wherein any of the networked schedule objects that have schedule attributes that fall outside the one or more filter criteria are displayed according to a first, default display format and any of the networked schedule objects that have schedule attributes that fall inside the one or more filter criteria are displayed according to a second, different display format; on the graphical overlay, adjusting at least one of the schedule attributes such that one or more of the schedule attributes that fell inside the one or more filter criteria now falls outside the one or more filter criteria; and, in response to the adjusting of the one or more attributes, kinetically refreshing the graphical overlay by: updating any of the schedule attributes that are impacted by the adjusting of the one or more schedule attributes, and changing the networked schedule objects that were displayed according to the second, different display format, but that now have schedule attributes that fall outside the one or more filter criteria due to the adjusting or the updating, to display according to a third display format that is different than the second display format.

An example method of the present disclosure can also be embodied in a computer application that is encoded in non-transitory computer-readable media. The computer application may include instructions that are operable when executed to perform the method.

An example computer application of the present disclosure can also be embodied in a system for interactively transforming a schedule display. The system may include a screen display that is operable to provide a graphical user interface, and one or more processor modules that are operable to perform an example method of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

This disclosure may be better understood with reference to the following drawings and description. The figures are not necessarily to scale, emphasis instead being placed upon illustrating the principles of the disclosure. In the figures, like referenced numerals designate corresponding parts throughout the different views.

DETAILED DESCRIPTION

A project schedule application allows a user to schedule activities associated with a project. For example, the application allows a user to input a network of activities, milestones, and logic ties (connecting the activities and/or milestones). The application performs calculations using algorithmic rules and allows a user to generate an output display of the schedule.

A schedule application may use algorithmic rules, such as critical path method ("CPM") or graphical path method ("GPM"), to calculate activity dates, total floats, or other schedule information.

As discussed above, a change to the schedule in the CPM application requires another complete iteration of forward and backward passes for the entire network, which limits the use of CPM applications as a network visualization tool.

In contrast to CPM applications, a GPM application is a network visualization tool that, without a forward or backward pass, kinetically refreshes the schedule information and network display, only where impacted, as a user physically manipulates the activities, logic ties, and milestones on the display. There is, therefore, no need to rely on a Gantt chart output of the schedule because the GPM application continuously displays a graphical rheonomic network on the computer or tablet display screen.

Some schedule applications may further allow a user to create a snapshot of a schedule at a desired point of schedule progress, also known as a target schedule. The creation of a target schedule may, for example, involve saving a current progress state of the schedule, including all objects and their respective parameters at that instant of schedule progress. The saved, current progress state of the schedule thus serves as the target schedule for subsequent analysis. As a project unfolds, and the schedule progress is updated, the updated schedule may be compared to any previous target schedule (base case) to distinguish activities and milestones that, for example, are ahead of schedule or behind schedule, or that have gained or lost drift, float or total float, in comparison to the target schedule. Moreover, a target schedule (as an alternate schedule) per se, may be readily compared to any other target schedule(s) (as a base-case schedule(s)) to ascertain schedule trends.

Figure 1:
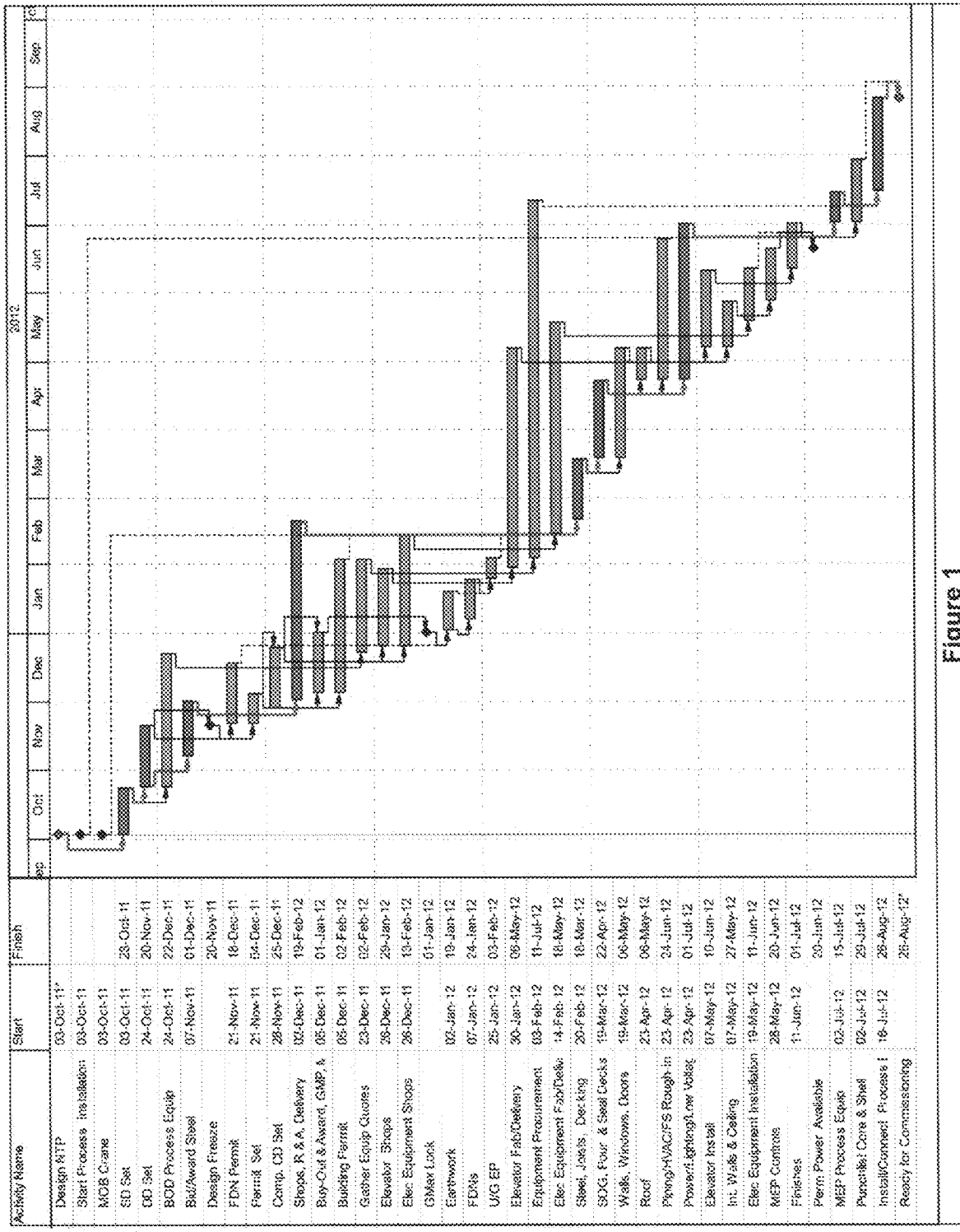
FIG. 1 illustrates an example output of a CPM schedule using a Gantt chart.
Figure 2:
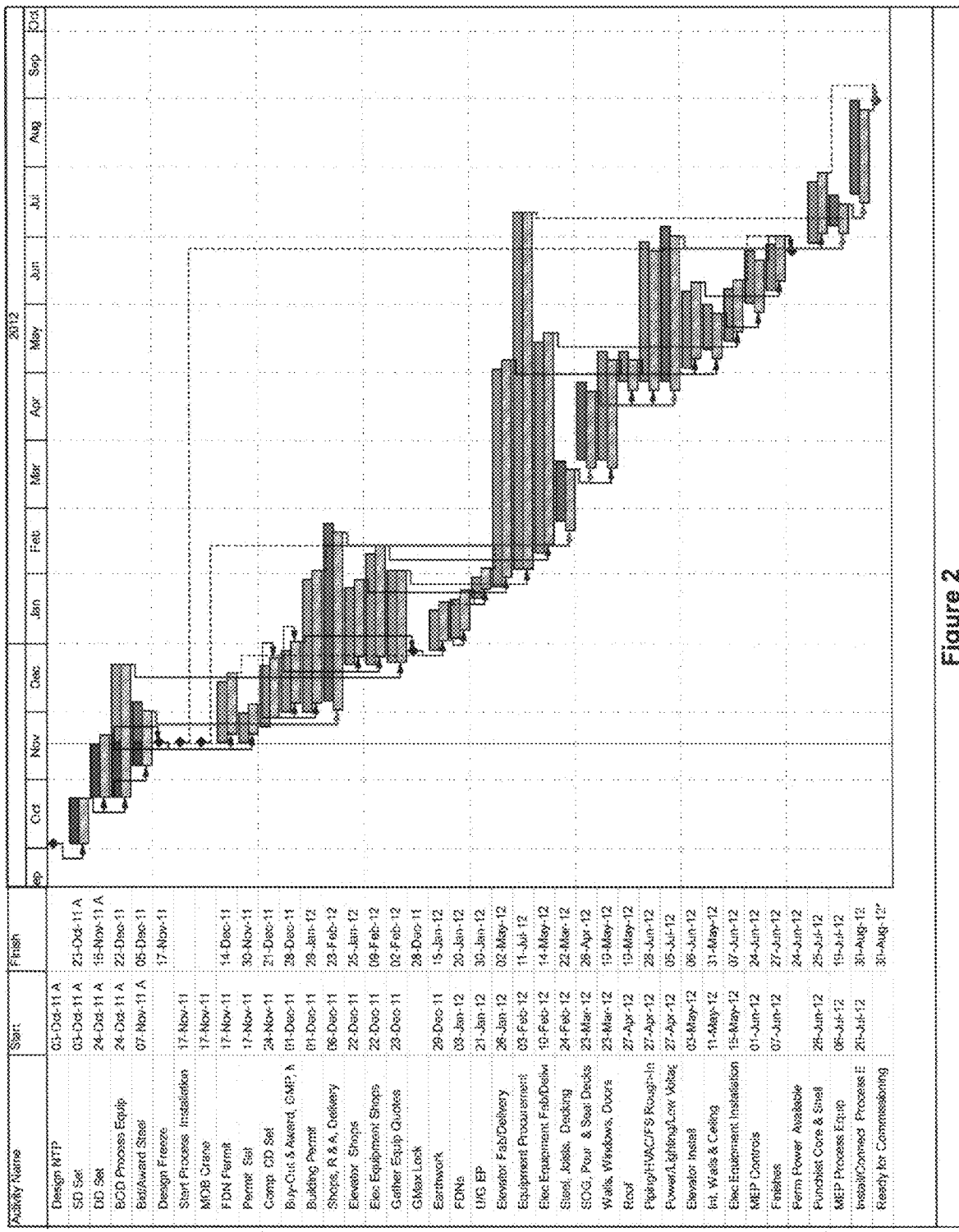
FIG. 2 illustrates an example Gantt chart used to show both a current schedule and a selected target schedule in the same output.

In CPM applications, comparison between an updated schedule and a target schedule invariably involves working with a static Gantt chart that has two horizontal bars for every activity. The most common format shows a bar for each current activity duration/start date/finish date above another bar for each target activity duration/start date/finish date. Such "two-bar" Gantt charts are incapable of portraying network logic flow and are visually cumbersome, as shown in FIG. 2. Moreover, because a Gantt chart is a mere output of the underlying schedule database, it is a static, non-modifiable output of the schedule. Revisions to the schedule and Gantt chart require successive input sessions, and each session requires another complete iteration of the forward and backward passes of CPM calculations, which culminate again in a new, revised Gantt chart that is also static and non-modifiable. As can be appreciated, any trial-and-error revision to test the influence of changes to the schedule using such CPM applications would require substantial effort to generate a new Gantt chart for every revision iteration.

In this regard, the present disclosure, which is based upon the GPM application, provides a filter-based graphical method for dynamically transforming a rheonomic network schedule display into a graphical flow graph that kinetically refreshes the display of the schedule and visually distinguishes, for example, which activities are ahead/behind schedule or have gained/lost duration, drift, float, or total float relative to previously generated target schedule dates. Moreover, because the display of the schedule is instantly self-correcting with respect to whether an activity/ies is/are behind schedule as the user physically manipulates network objects on the canvas display, the graphical overlay of an updated schedule or a baseline schedule with a target schedule is a useful platform for interactively and rapidly evaluating whether varying combinations of activity/logic tie revisions accomplish the goal to restore the current schedule to on-target performance. The following definitions may be useful in understanding this disclosure:

activity: network object denoting a task that must be performed, a time-consuming schedule restraint, or a delay denoting the effect on timing from what was planned.

alternate schedule: the rheonomic network schedule displayed on the canvas or a target schedule being compared to another base-case target schedule.

base schedule: a previously generated target schedule.

benchmark: network object denoting a fixed start or completion event (occurs in an instant) that has zero total float, and that is used to model an overarching milestone.

canvas: surface upon which the network schedule is displayed.

data date: date that splits an updated schedule between a statused (as-built) portion left of the data date and a forecasted portion right of the data date.

drift: extent an activity may gain schedule (e.g., shift or extend backwards to an earlier position) without overriding network logic. For any activity, drift+float=total float.

early (late) times: earliest (latest) an activity may start/finish or a milestone may occur, as determined by the CPM forward pass (backward pass) and by the GPM algorithms.

embedded node: event intermediate of, or right on, the start or finish node of an activity, through which the activity is linked to another activity, a milestone, or a benchmark.

float: extent a positive-drift activity may be delayed beyond planned dates and not extend project completion; float equals total float for activities on early times.

gap: for two linked objects, extent the predecessor may be delayed and not impact the successor, and the successor may gain schedule and not impact the predecessor.

graphical path method (GPM): planning/scheduling method that serves as the engine behind graphical and visualization applications that, without a CPM forward pass or backward pass, kinetically both recalculates the schedule and refreshes the schedule display—only where impacted—as a user physically manipulates activities, logic ties, milestones, and benchmarks. Allowing activities to be scheduled on planned dates while retaining the ability to float back (drift in GPM lexicon), GPM calculates gaps, which are used to calculate late dates and float attributes. Total floats and the as-built critical path are calculated left of the data date.

kinetic interface: display that refreshes the displayed schedule in real-time by recalculating date and float attributes of the schedule in response to and during physical manipulation of time position of network objects on the displayed schedule.

logic tie: network object drawn as a directed edge connecting two activities, an activity and a milestone or benchmark, two milestones, or a milestone and benchmark.

milestone: network object denoting a start or completion event (occurs in an instant) that, if linked and unrestrained by an artificial date constraint, is controlled by the start or finish time, respectively, of its linked activities.

network, logic network: flow graph of the schedule comprising rule-encoded, algorithmic activities (possibly including delay-modeling activities), embedded nodes, milestones, and benchmarks, which are linked by designated predecessor-successor links.

networked schedule objects; also objects or network objects: activities, logic ties, milestones, and benchmarks that are interconnected in a logic network.

planned dates: in GPM, physically manipulated times—between early and late times—that do not replace early times and generate drift, thereby preserving total float.

rheonomic network: network schedule flow graph with a time-dependent layout;

also referred to as a time-scaled network. The opposite is a scleronomic network that lays out activities without considering time as a variable.

target schedule: saved snapshot of a current state of the schedule, including all objects and their parameters, for example, a snapshot at a given point of progress (data date).

total float: extent an activity may be delayed beyond early dates and not delay overall completion; also, combined extent an activity on planned dates may be delayed and gain schedule and neither delay overall completion nor force an earlier project start or interim release date, respectively.

Figure 3:
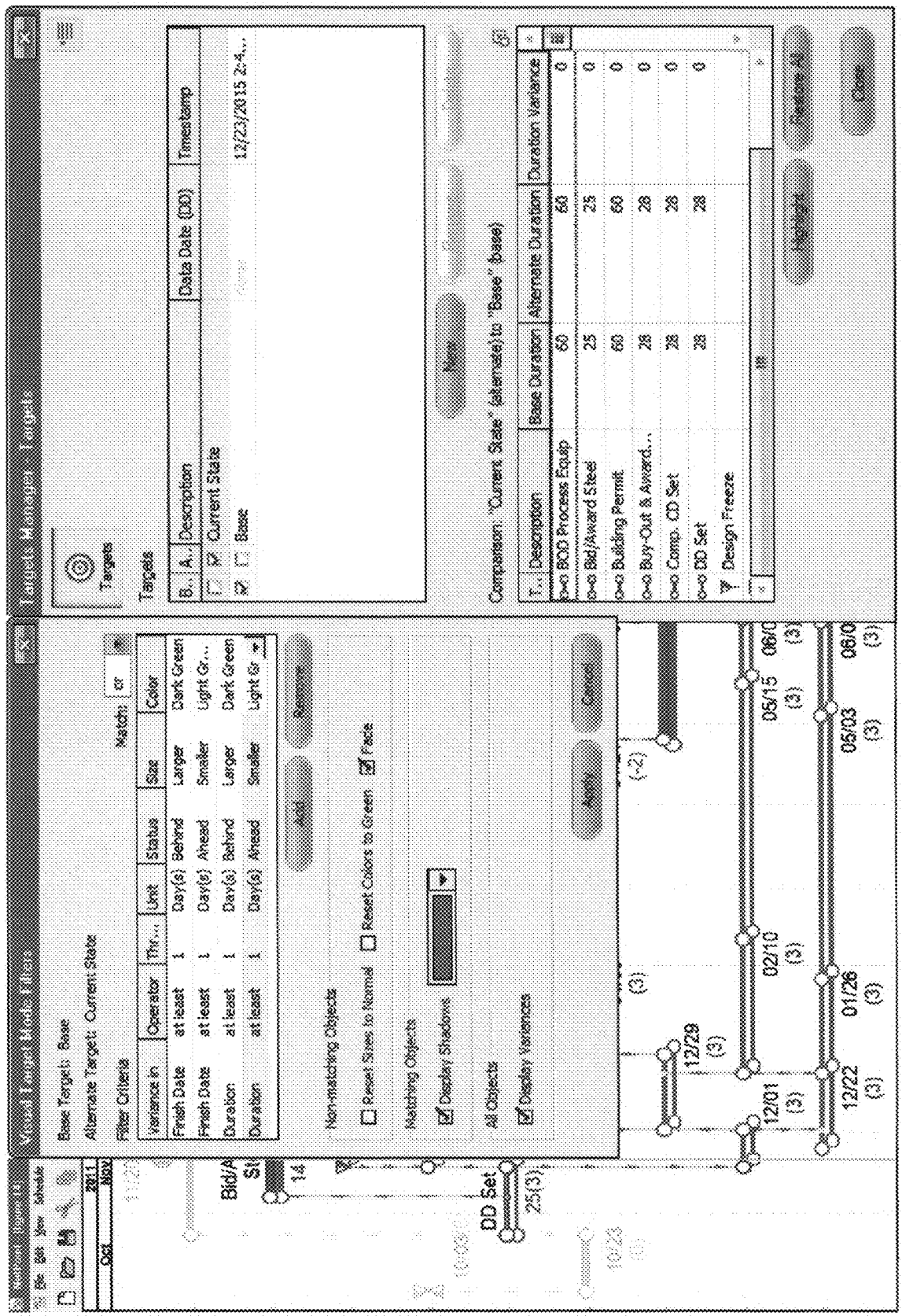
FIG. 3 illustrates an example GUI for a visual target overlay application.

FIG. 3 shows an example of a screen display of a graphical user interface (GUI) for a project schedule application that allows a rhenomic network schedule to be displayed on a canvas with a graphical overlay. The interface includes: 1) GPM application tool bars and menus that provide methods and supporting functions to create and modify the schedule, 2) a GPM schedule created by a user, and 3) an example Target Manager interface and Visual Target Mode Filters interface. These interface components may be implemented in combination or further subdivided into several parts.

Figure 4:
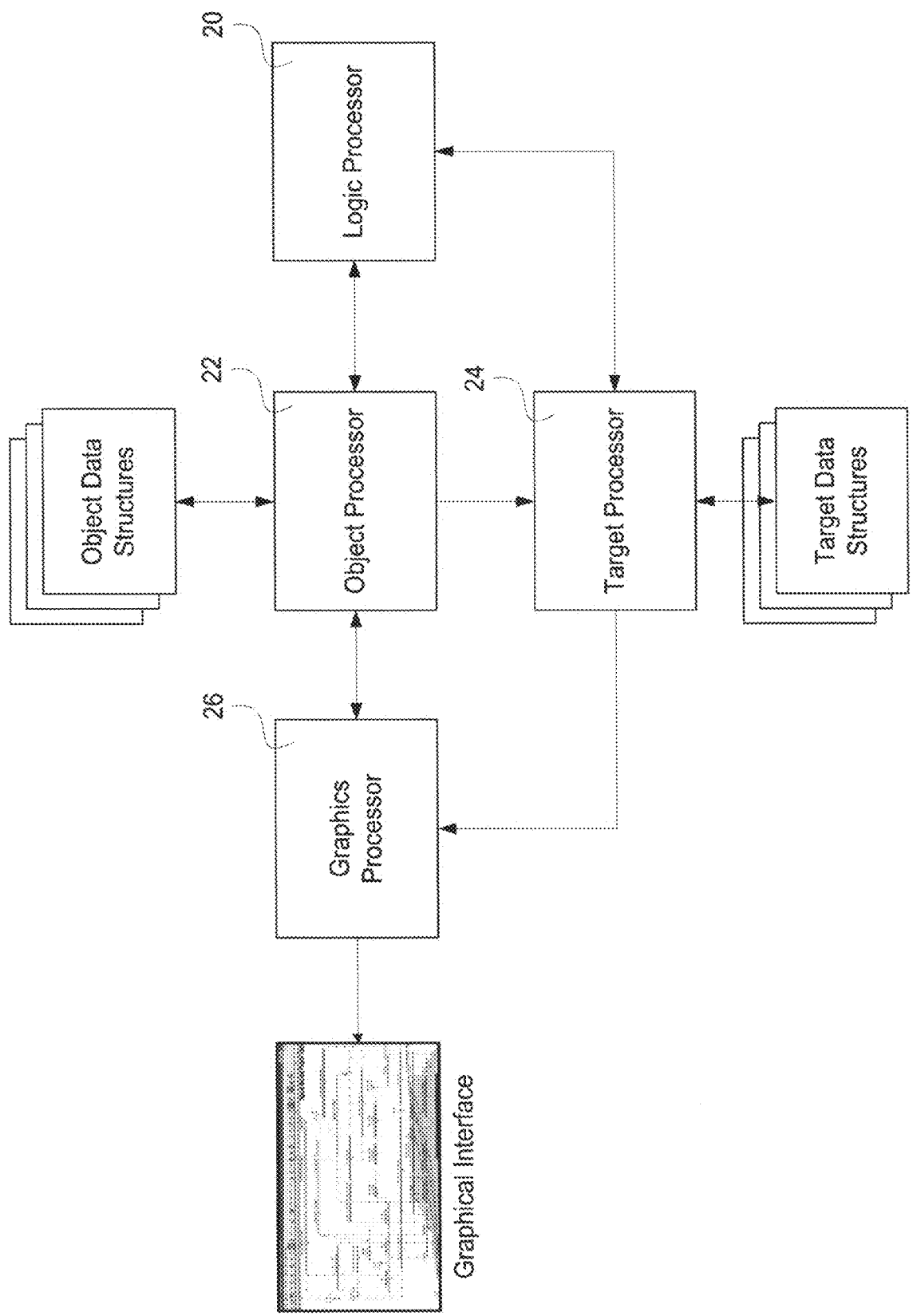
FIG. 4 is a block diagram of an example visual target overlay application.

An example scheduling system is shown in FIG. 4 and includes a logic processor 20, an object processor 22, a target processor 24, and a graphics processor 26 that are configured to operate with the screen display and graphical user interface described above. Each processor 20, 22, 24, and 26 may include software, hardware, or both, and may be further subdivided or combined in one or more processors or modules. The system is operable to execute a computer application encoded in non-transitory computer-readable media. The application contains instructions that, when executed, are operable to carry out the methodologies and functions described in this disclosure. Thus, the system is understood to incorporate the capabilities of the application, and the application is understood to incorporate the methodologies and functions herein.

The application may be implemented in one or more computer programs executing on one or more programmable systems comprising at least one processor and at least one data storage system. Each program may be implemented in any desired computer language to communicate with a computer system. The application may also include a computing network that enables the processors 20, 22, 24, 26 and/or other computing devices to communicate and exchange data, including any communication method by which information may travel between computing devices. The network may include one or more of a wireless or wired network, a local or wide area network, a direct connection such as through a Universal Serial Bus port, and the set of interconnected networks that make up the Internet, an Intranet, or other distributed computing network.

Figure 5:
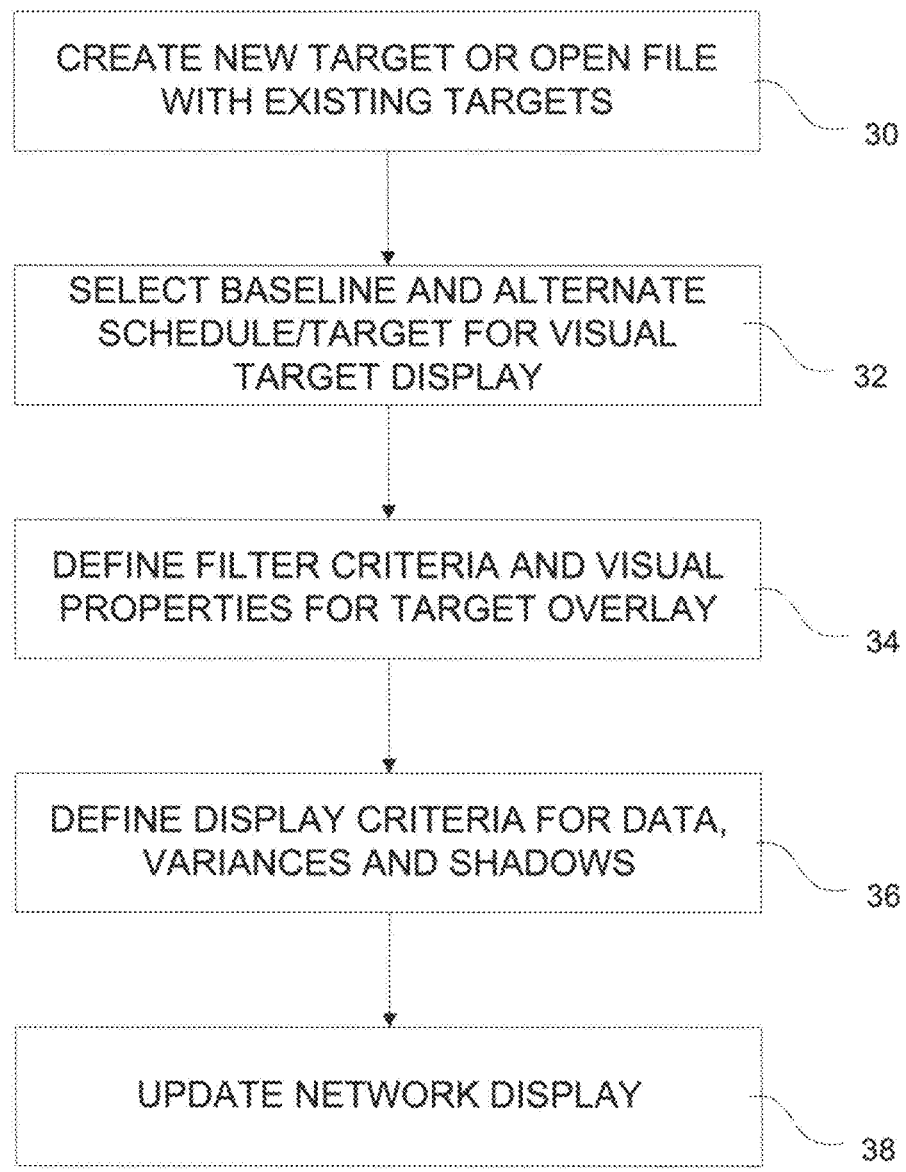
FIG. 5 is a flow chart of an example of the operation of the object processor.

As indicated above, the present disclosure utilizes a graphical overlay of an updated schedule or a baseline schedule with a target schedule as platform for interactively and rapidly evaluating whether varying combinations of activity/logic tie revisions accomplish a goal to restore the current schedule to on-target performance. In this regard, a user can define at least one target schedule for a project, to create a visual flow graph of the project in a graphical overlay. FIG. 5 illustrates a flow diagram of an example application executed by the target processor 24, for example. At 30 the application enables a user to either create a target schedule for the current project or select a project with at least one predefined target schedule. Thereafter, the application permits the user at 32 to select a baseline schedule (for example, the last saved target schedule) and an alternate scenario (for example, current schedule progress state). At 34 the user can define one or more filter criteria to filter objects of the baseline schedule, according to attributes, that are ahead of schedule, behind schedule, or on schedule in comparison to the target schedule, and accordingly define display formats to visually distinguish the objects on a graphical overlay. At 36, the application permits the user to define display criteria, to add or remove information displayed on the graphical overlay, such as data (including dates, duration, drift, float, total float, etc.), variances from the baseline schedule, and target schedule shadows. At 38, the application kinetically refreshes the graphical overlay on the display screen by updating the display to reflect any changes to the display format and display criteria or as the user interacts with the objects of the rheonomic network schedule.

Figure 6:
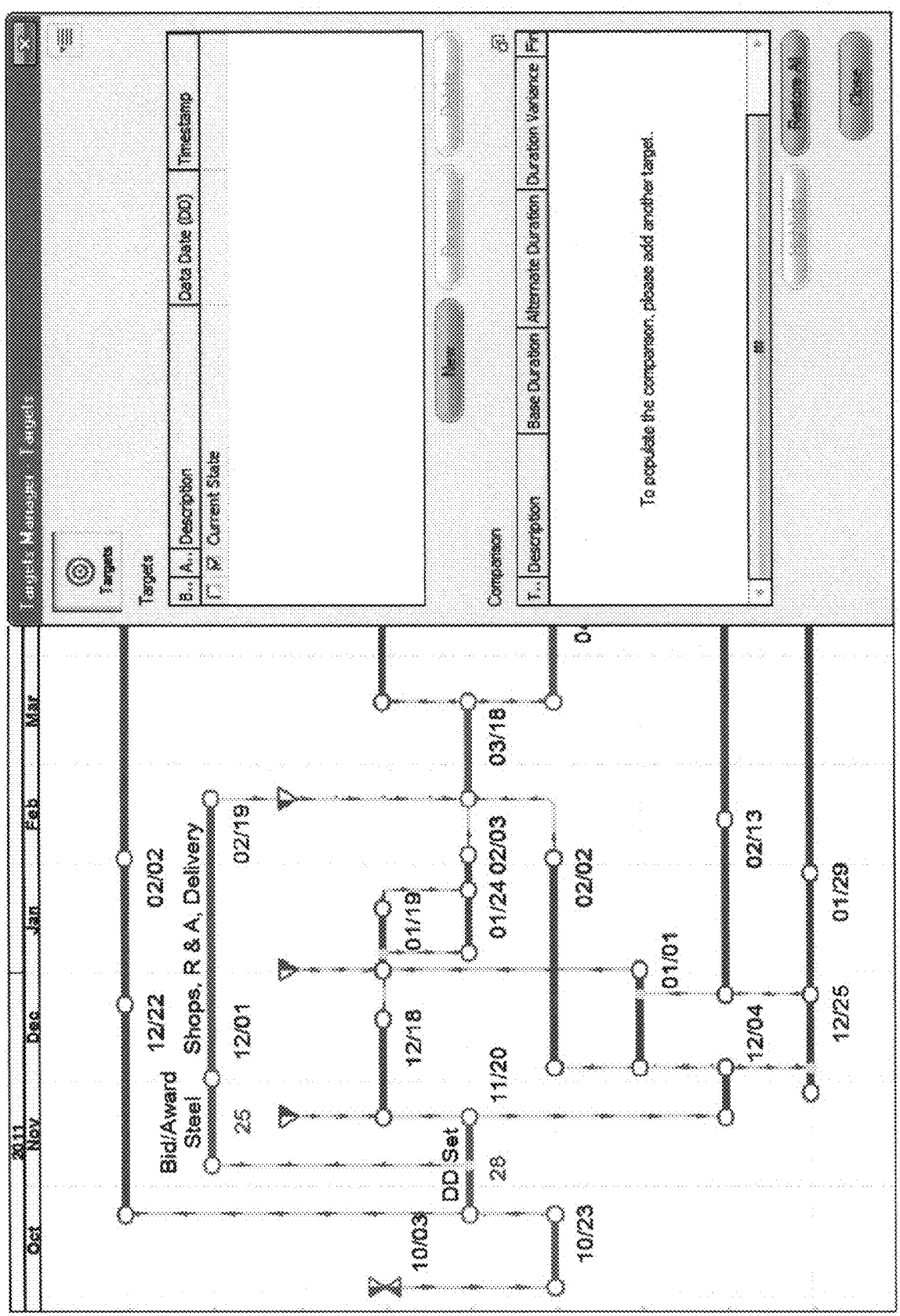
FIG. 6 shows an example Target Manager interface used to generate targets.
Figure 7:
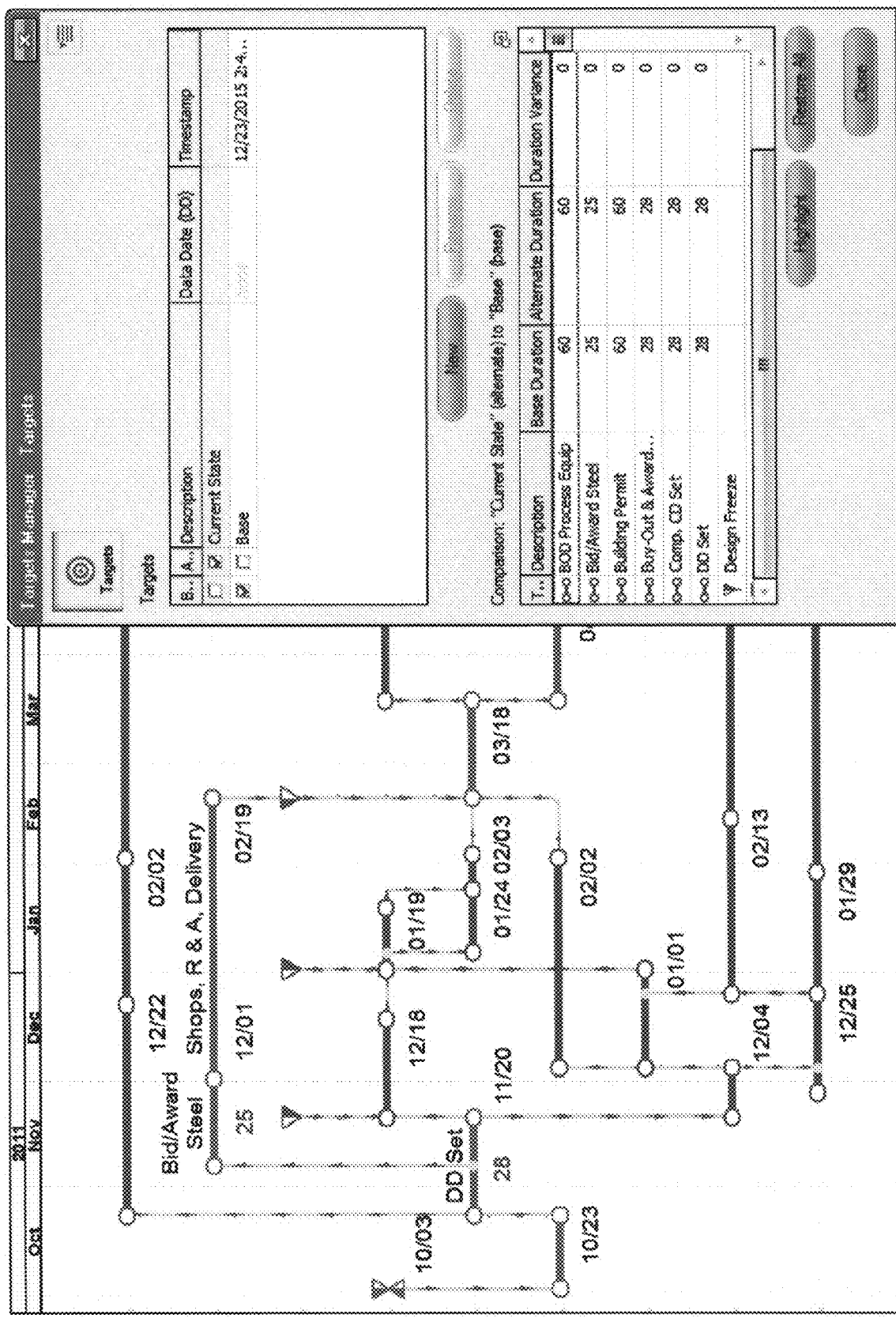
FIG. 7 shows an example Target Manager that lists base duration, alternate duration, and duration variance.

FIGS. 6 and 7 show an example interface for a "Target Manager" that can be used to generate target schedules as a precursor to generating the graphical overlay. The "Target Manager" is used to create a target schedule from the schedule instance that is displayed on the canvas through the "Targets" icon or button. An upper window ("Targets") lists the schedule displayed on the canvas and every previously generated target schedule. A lower window ("Comparison")

lists the activities, milestones, and benchmarks displayed on the canvas, along with comparisons of selected schedule attributes of a baseline schedule and a target schedule. The comparisons are represented in this example as variance, which is the difference in value between a given attribute of the baseline and target schedules. The comparison of the attributes may be used in a determination of whether objects of the baseline schedule are ahead of schedule, behind schedule, or on schedule with respect to a target schedule.

A user may create a new target schedule by saving the displayed schedule instance using the "New" button. Most commonly, saving the preceding update as a target schedule is the first step in the schedule updating process. Upon actualizing completed and in-progress objects, it is possible to compare the work-in-progress update against the prior update, ascertain which activities are delayed, if any, and, if relevant, consider various activities/logic tie revisions right of the data date to recover schedule.

Generating a target schedule is also useful where a user employs a "what-if" analysis by trial-and-error combinations of activity/logic tie revisions. Under the what-if analysis the user can see in real-time whether the revisions crash the schedule to attain earlier completion, see in real-time whether the revisions extend the schedule completion to take advantage of available total float on the critical path, or reschedule activities to level a resource. Most typically, a target schedule is generated from the original (base-case) schedule for the purpose of determining how the instant what if revisions to the schedule are proceeding.

Figure 8:
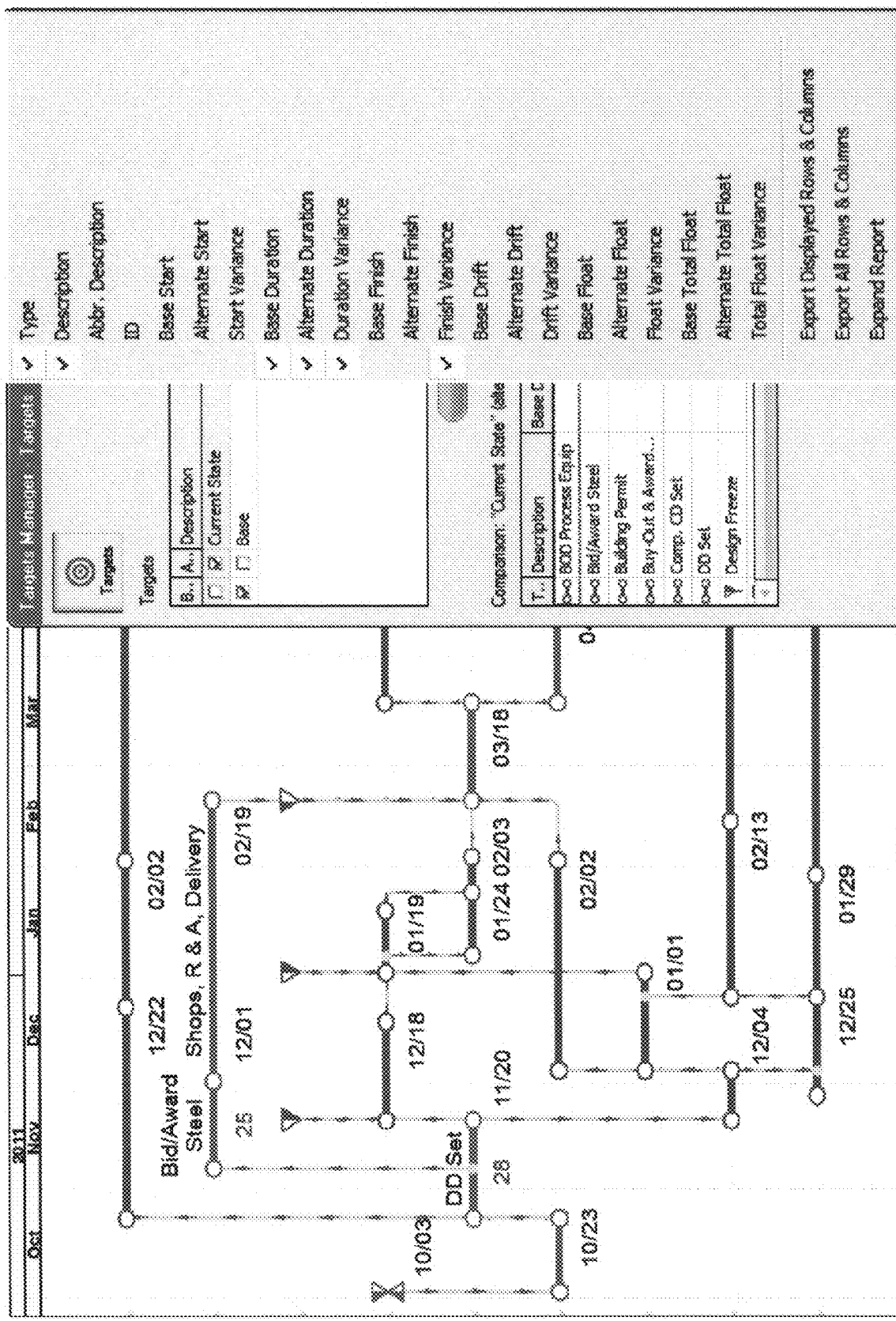
FIG. 8 illustrates the types of base and alternate schedule attributes that may be compared in an example embodiment.

The application herein enables the user to compare baseline and target schedules or compare two target schedules (wherein one is used as the "baseline") through the "Target Manager" or "Visual Target Mode Filters" interface. Comparisons of selected schedule attributes using the "Target Manager" are tabular, and are activated once a baseline schedule or two or more baseline schedules are selected in the aforementioned "Targets" window. The attributes of the baseline and target schedules are compared and displayed in the lower window as variance, which populates all or selected objects (e.g., activities within a time window) on the canvas and provides tabular comparisons for all selected attributes, including, but not limited to base start, alternate start, start variance; base duration, alternate duration, duration variance; base finish, alternate finish, finish variance; and so forth. In the example in FIG. 7, the user has selected schedule attributes for base duration, alternate duration, and duration variance. The user may select/deselect schedule attributes by clicking the column header or any other appropriate interface. In the example illustrated in FIG. 8, the user has selected 22 schedule attributes.

Figure 9:
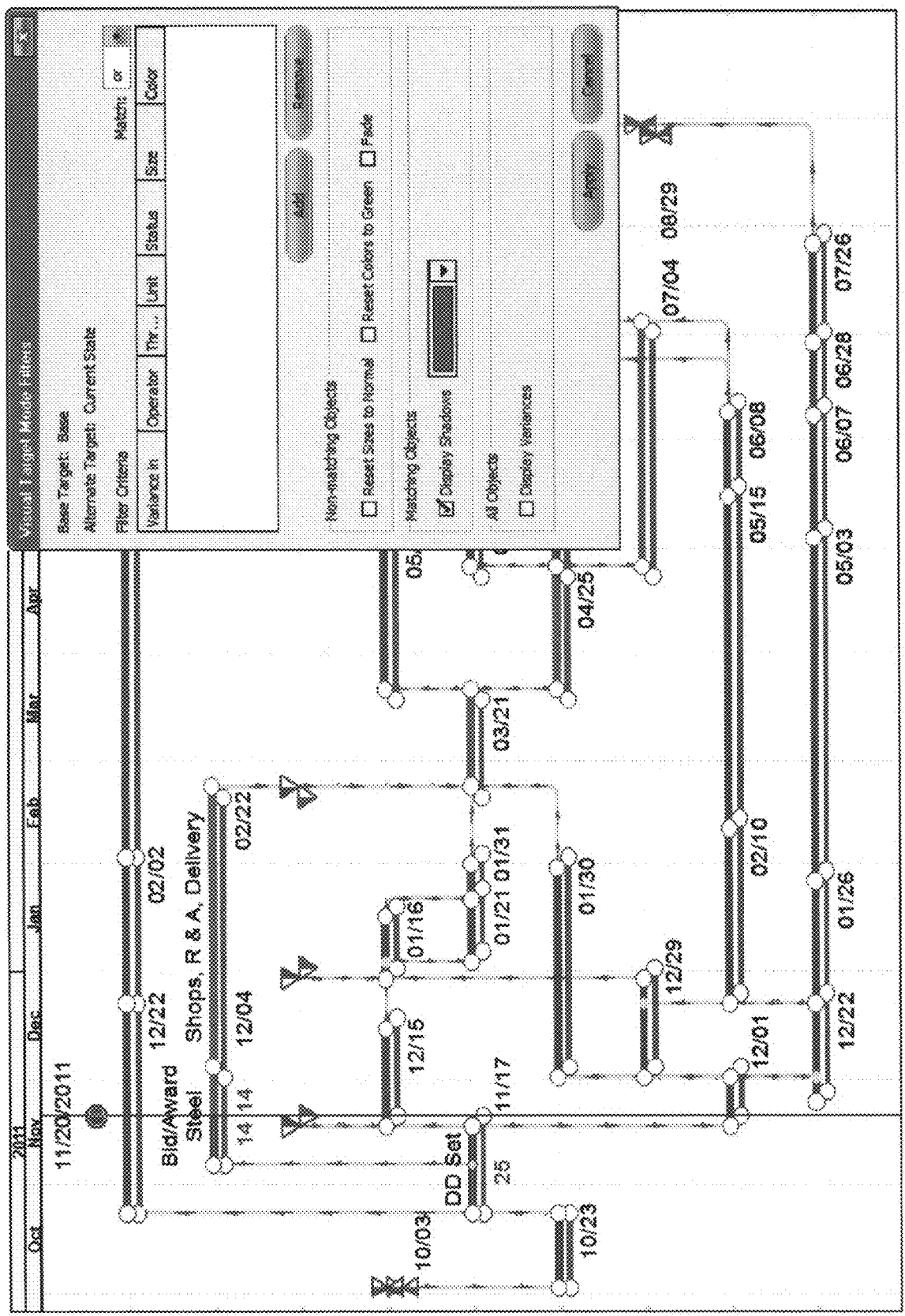
FIG. 9 shows an example rheonomic network schedule displayed on the canvas where target information is portrayed as blue bars slightly beneath the activity bars.
Figure 10:
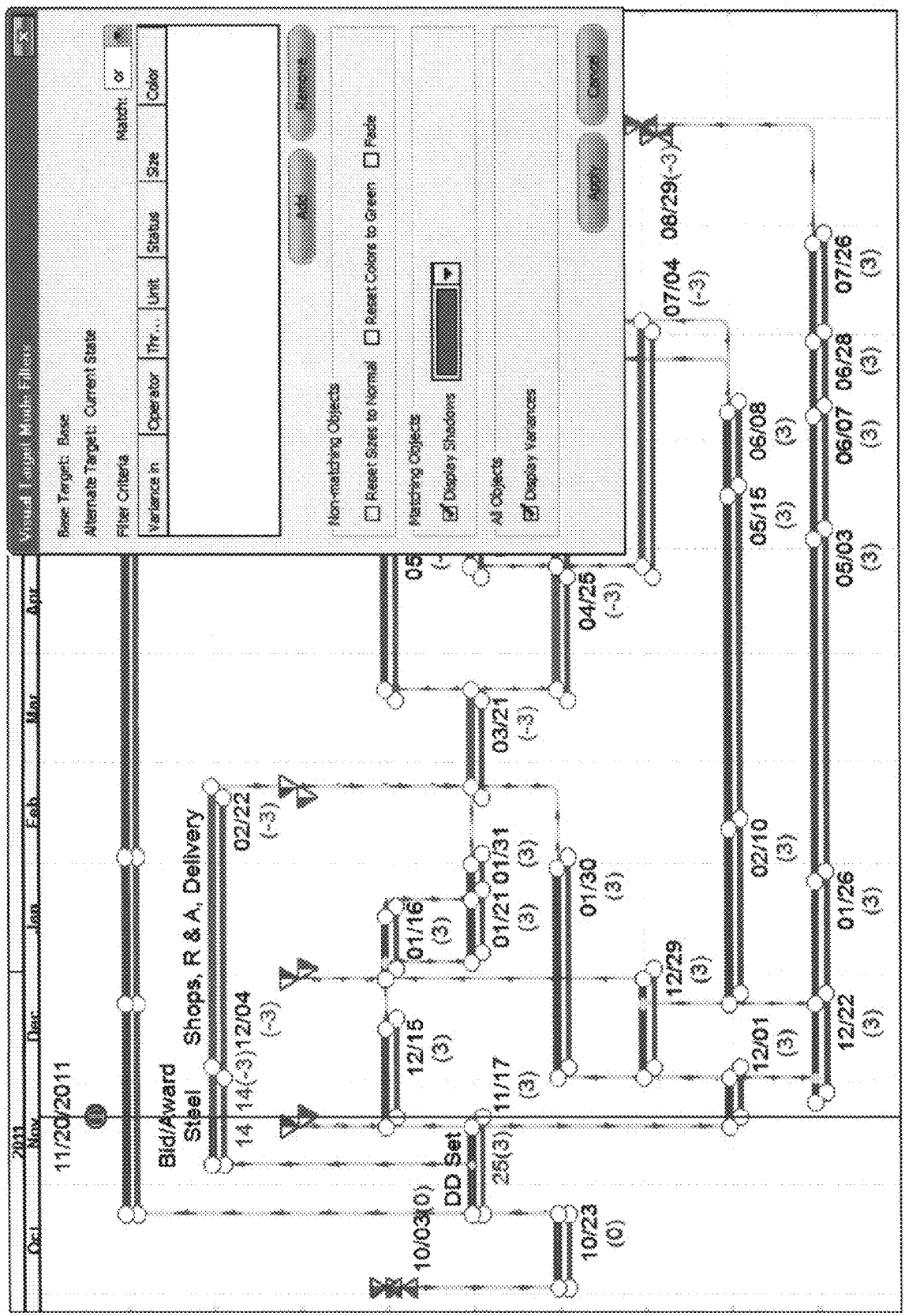
FIG. 10 shows an example rheonomic network schedule displaying variances.

The method and application further permit the user to activate a graphical overlay comparison tool through the example "Visual Target Mode Filters" interface by clicking on "Display Shadows" and using the scroll box to select different display formats for the schedules selected for comparison. In this example, the different display formats are shadow colors. In FIG. 9, with the current updated rheonomic network schedule displayed on the canvas, the selected prior update is portrayed as shadow blue bars slightly beneath the current schedule activities. When shadows are displayed, values for start date, finish date, duration, drift, float, and total float variances can also be displayed by clicking on the "Display Variances" option. Shadows, along with start date, finish date, and duration variances, are displayed in FIG. 10.

Figure 11:
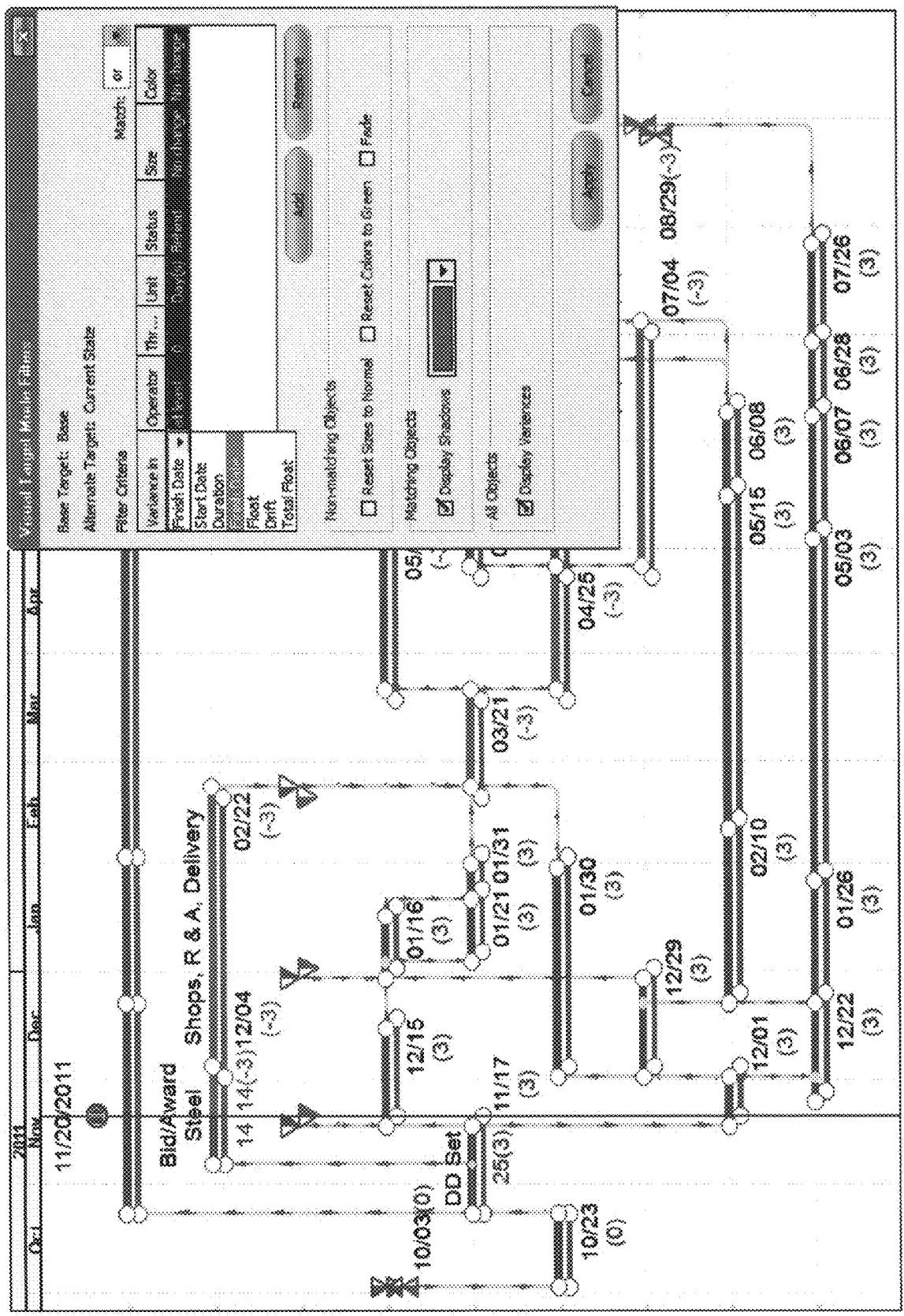
FIG. 11 shows an example of how target overlay filters are generated.
Figure 12:
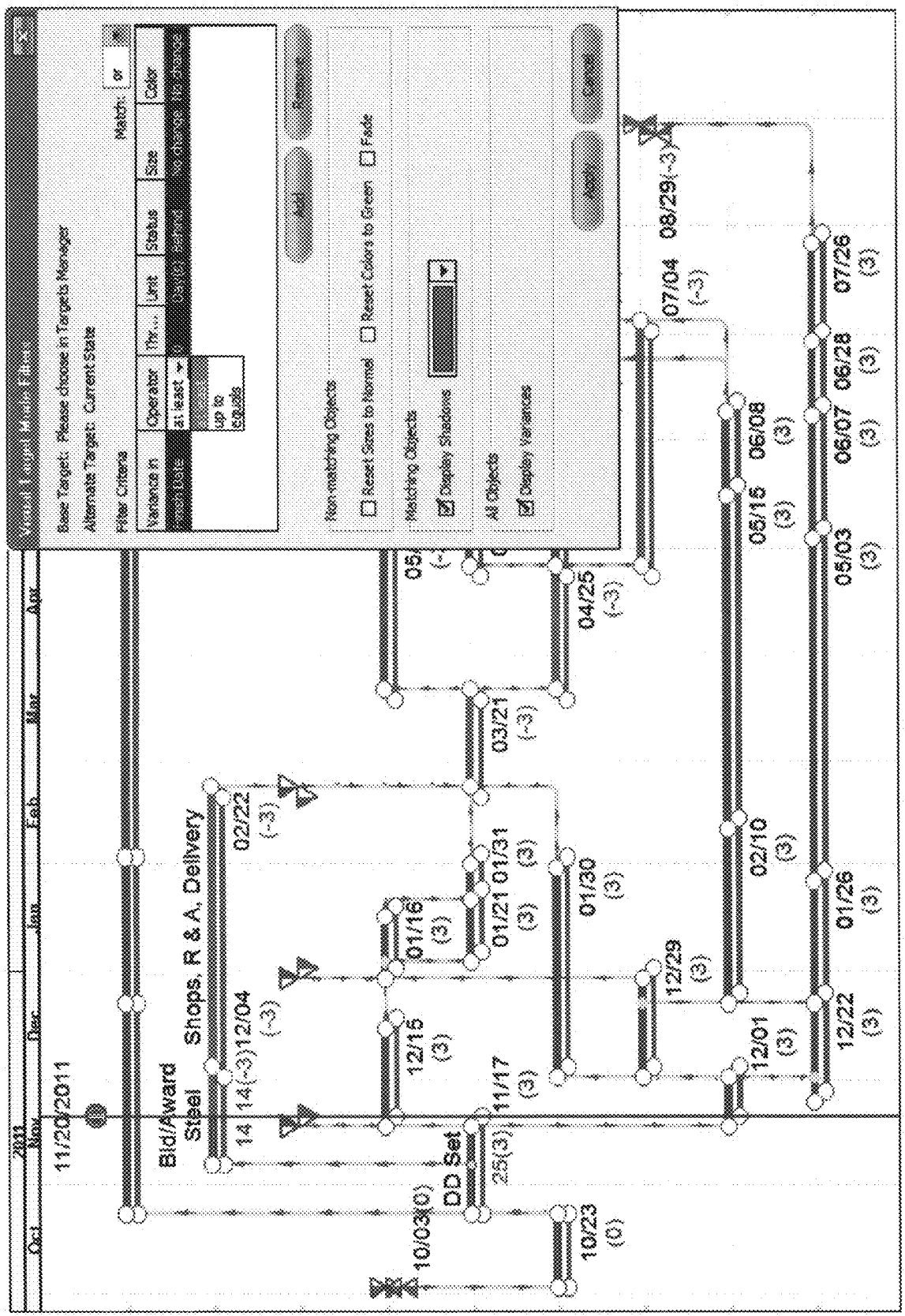
FIG. 12 shows an example interface to filter activities ahead of, on, or behind schedule.

A "Visual Target Mode Filters" interface further allows the user to select filter criteria for the graphical overlay. The interface in FIG. 11 is one example. In this example, the alternate schedule is the schedule displayed on the canvas, and the baseline schedule is a previously generated target schedule. The filter criteria are generated in the "Filter Criteria" window by clicking on the "Add" button or any other appropriate interface. In the example, clicking on the scroll option in the "Variance In" column reveals six variance options: start date variance, duration variance, finish date variance, float variance, drift variance, and total float variance. Further, with regard to selecting filter criteria, the user may select "at least," "up to," or "equal" operators by clicking on the scroll option in the "Operator" column, as illustrated in FIG. 12. Variance threshold is selected using the scroll feature in the threshold column. Time units and whether the alternate object is ahead of or behind schedule are selected through the scroll options on the "Unit" and "Status" columns. Thus, the filter criteria serve to identify selected schedule attribute comparisons between the baseline and target schedules, from which the application can make a determination of whether individual objects of a baseline schedule are ahead, behind, or on schedule, relative to a target schedule.

The filter criteria in the example interface also has options to manage the display format of the objects and enable the graphical overlay to kinetically refresh on the canvas to visually distinguish which objects are ahead of or behind schedule, or have gained or lost duration, drift, float, or total float by a selected threshold, or that do or do not meet the filter criteria (e.g., objects that are on schedule). For purposes of this disclosure, schedule attribute comparisons that do not meet a filter criteria are considered to be outside the filter criteria and schedule attribute comparisons that meet a filter criteria are considered to be inside the filter criteria. For example, a schedule attribute comparison that has a value of 4 is inside a filter criteria that requires values "greater than 3." As can be appreciated, terms such as "inside" and "outside" are semantic and can alternatively be defined in the inverse or using other terminology relative to a criteria threshold.

Figure 13:
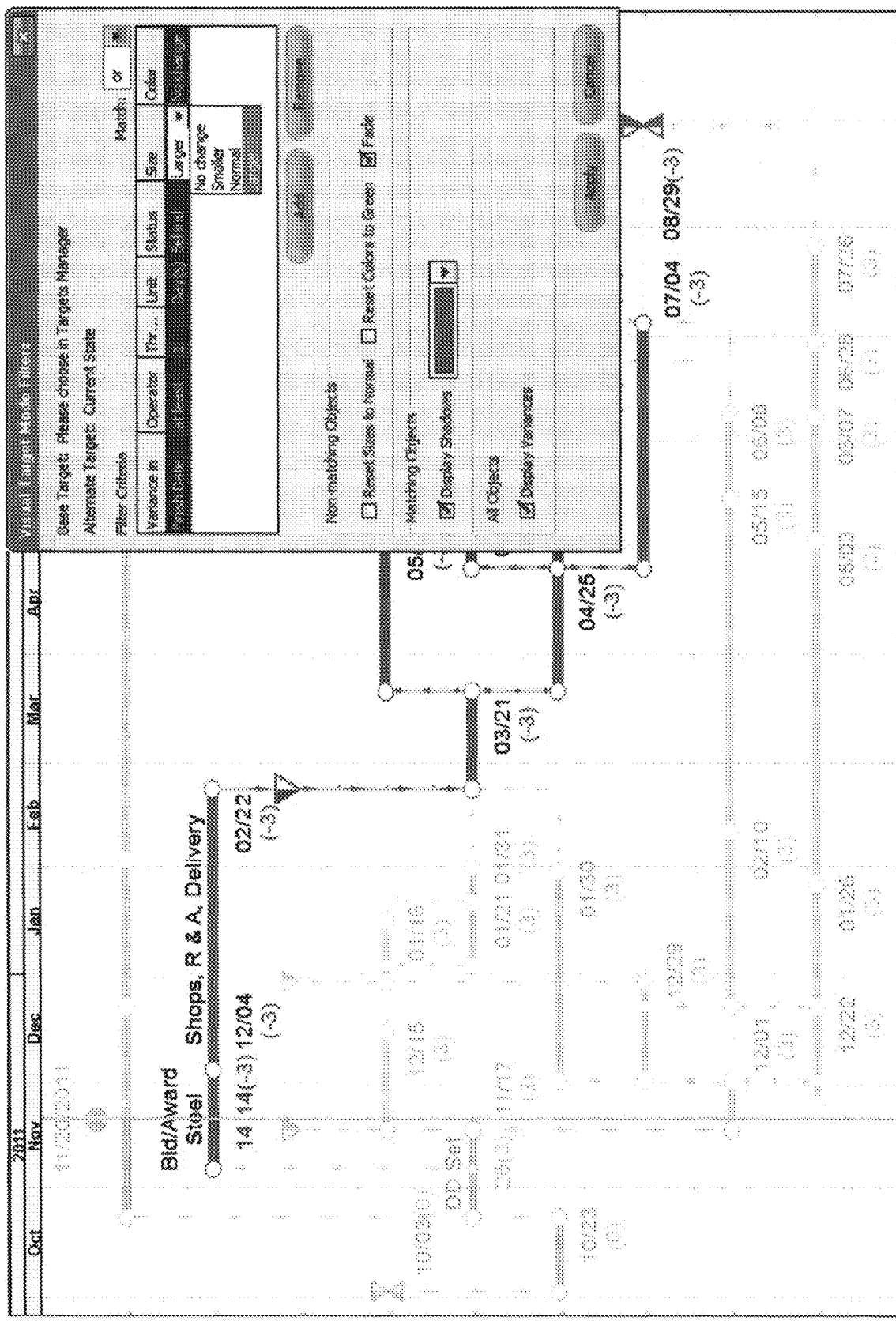
FIG. 13 shows an example rheonomic network schedule with a target overlay depicting activities behind target as enlarged bars.

The application also allows the user to change the display format in dependence on whether a schedule attribute comparison is inside or outside of one or more filter criteria. For example the display format relates to the size of the displayed bars on the graphical overlay, and through the "size option" in the "Filter Criteria window," as illustrated in FIG. 13, the user can resize the bars, for example, to display thicker bars for activities that are behind schedule. With the critical path activities shown in red, the user can readily visually perceive that the current schedule has fallen three days behind the target schedule and that 3 days of total float variances are displayed on the critical path. As can be appreciated, the display format is not limited to bar size, and may additionally or alternatively include bar type (e.g., double line, etc.), bar color, bar pattern, or other visual bar property.

Figure 14:
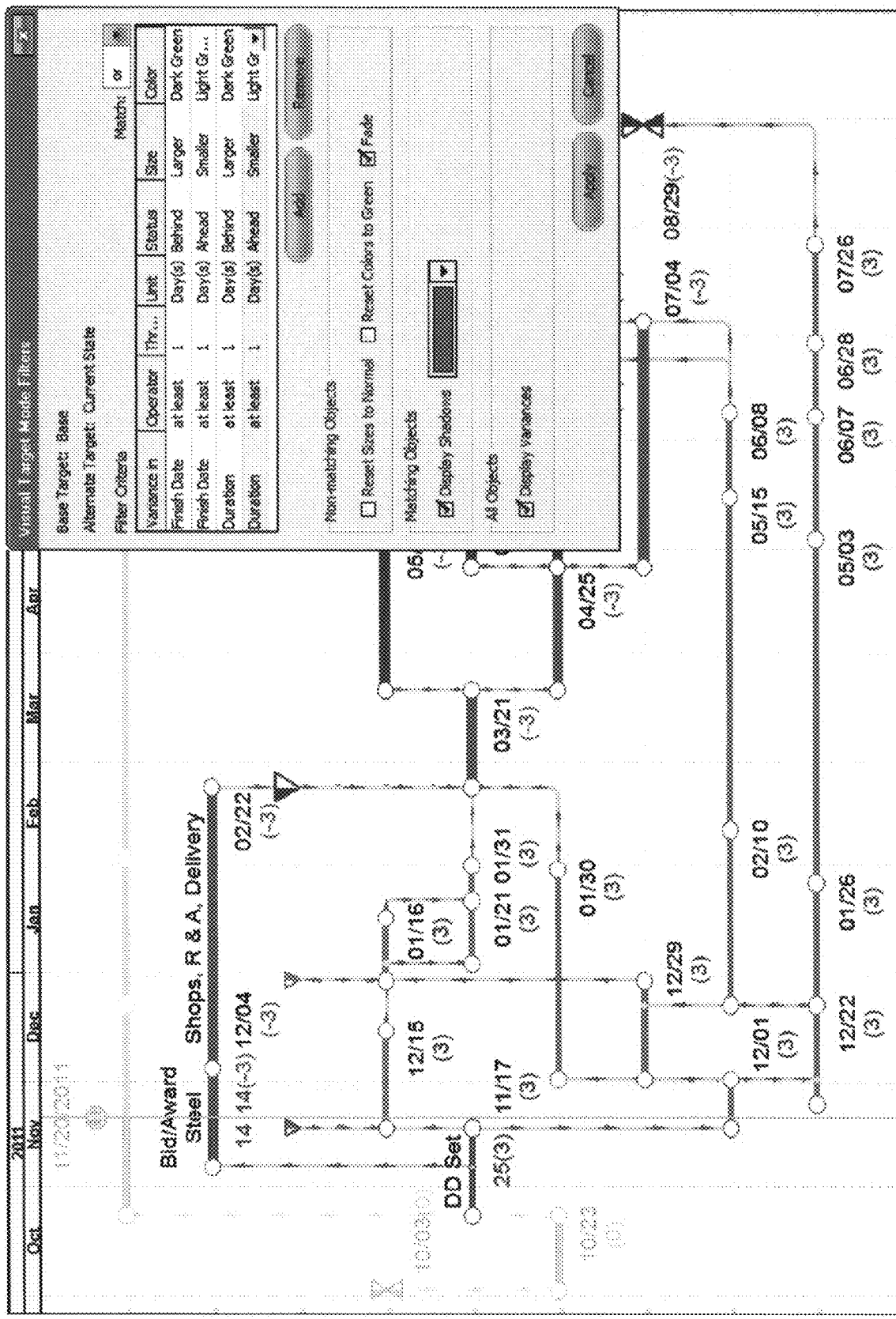
FIG. 14 shows an example rheonomic network schedule with a target overlay where activities behind target dates or of longer durations are enlarged bars.

FIG. 14 illustrates an additional example filter criteria where thicker bars are shown for activities that are at least three days behind schedule relative to their finish dates or three days longer than in the target schedule as a precursor step to considering combinations of what-if revisions to restore the schedule to on-target performance. In this example, the bars of activities that are ahead of schedule by a three-day threshold (i.e., outside the filter criteria) are displayed as thinner bars, while maintaining their original bar color. Bars of activities that are behind schedule by the three-day threshold (i.e. inside the filter criteria) are displayed as thicker bars that may have a different color than the bars of the activities that are ahead of schedule. Thus, the activities that are ahead of schedule or on schedule are displayed according to a first, default format, i.e., the thinner bars of a selected color, while the activities that are behind schedule are displayed in the graphical overlay according to a second, different format, i.e., the thicker bars of different color.

Figure 15:
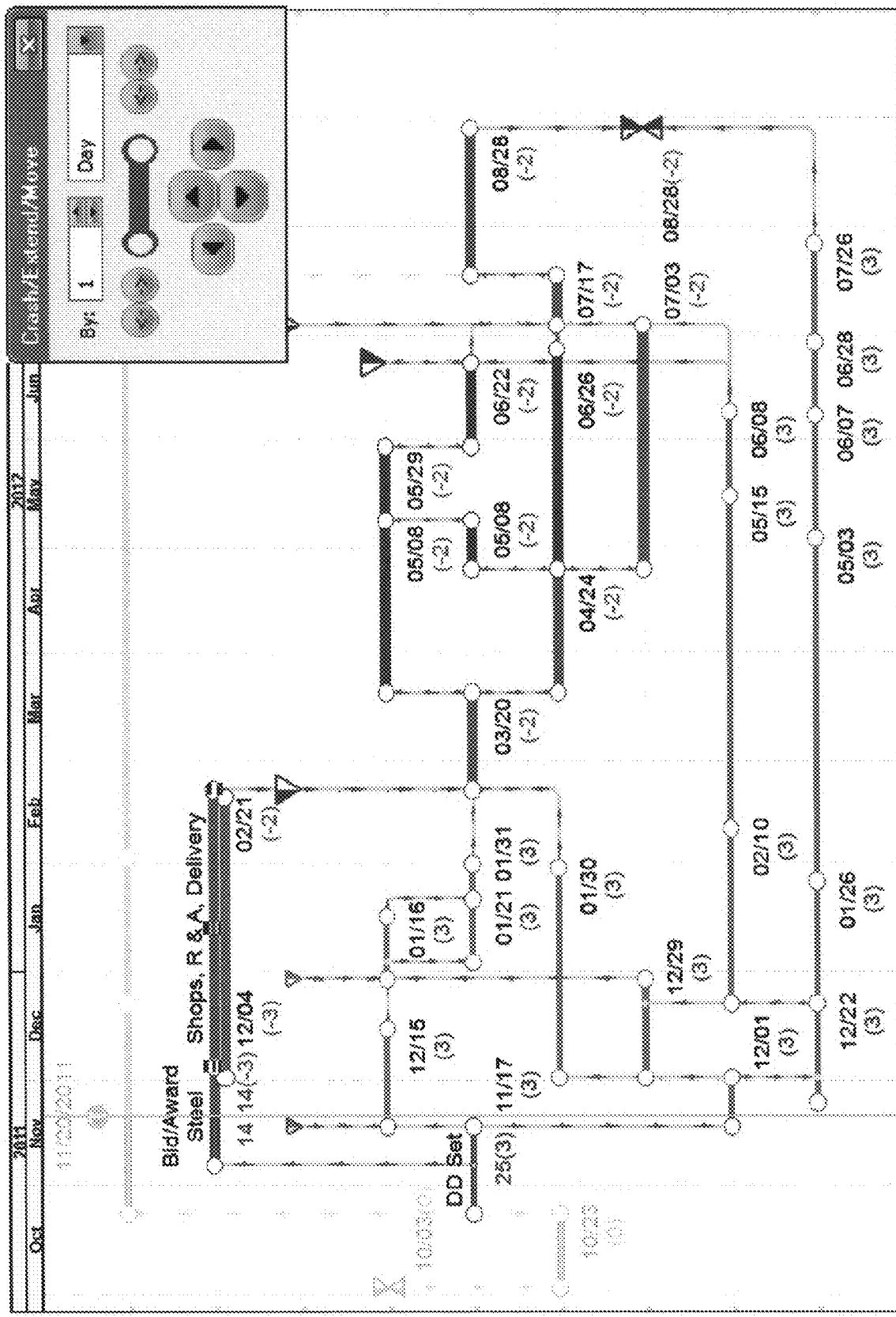
FIG. 15 shows an example rheonomic network schedule after shortening the Shops, R & A, delivery activity by one day toward restoring on-target performance.
Figure 16:
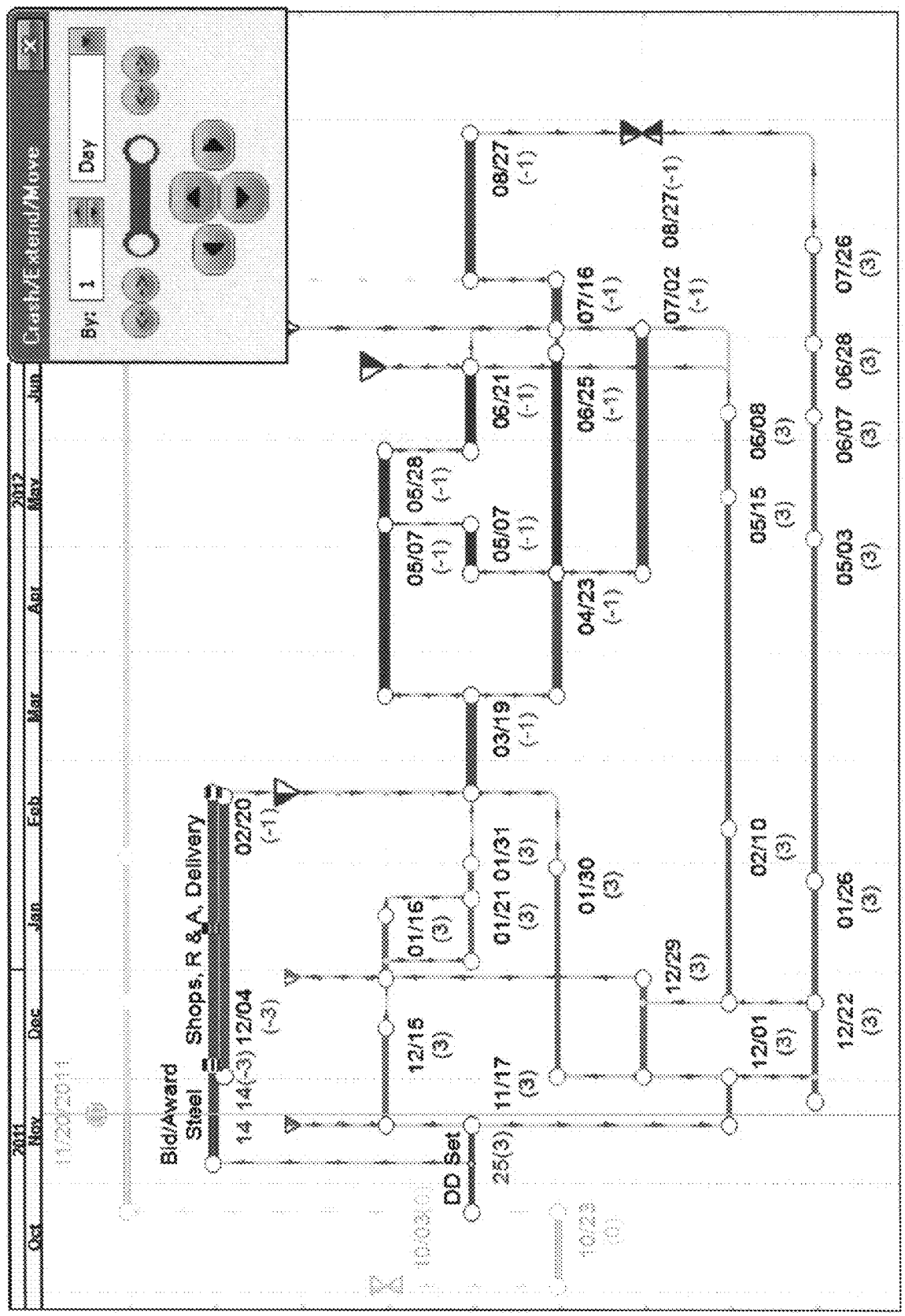
FIG. 16 shows the example rheonomic network schedule from FIG. 15 after further crashing Shops, R & A, Delivery by a day toward restoring on-target performance.
Figure 17:
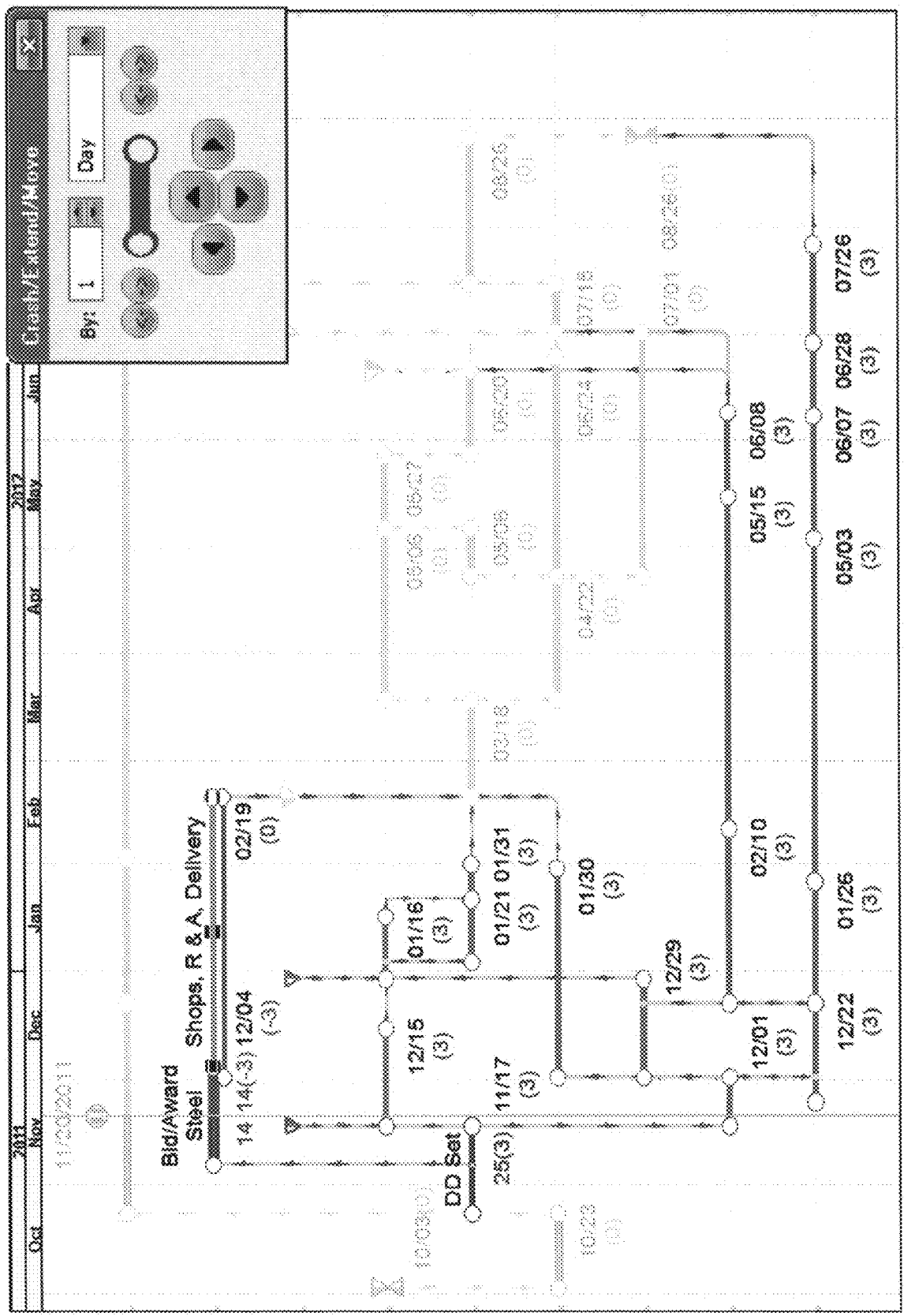
FIG. 17 shows the example rheonomic network schedule from FIG. 16 after further crashing Shops, R & A, Delivery by a day causing enlarged bars to resize to normal bars.

To regain schedule, in the examples illustrated in FIGS. 15-17, the user has activated a gestural box option (shown in the upper right hand corner) for physically manipulating the objects on the graphical overlay. The gestural box allows the user to adjust one or more schedule attributes or objects by shifting the time position of the attribute or object on the graphical overlay, which is continuously displayed during the adjustment. As can be appreciated, alternative interfaces can be provided to permit adjustment on the graphical overlay, such as but not limited to, dragging and dropping attributes or objects on the graphical overlay. Thus, as used herein, the term "adjustment on the graphical overlay," or variations thereof, refers the ability to dynamically adjust the attribute and/or object, in real-time, on the continuously displayed graphical overlay without having to completely regenerate the entire graphical overlay anew.

In this example, the schedule attribute is the duration of the Shops, R&A, Delivery activity, and the user can adjust the duration by unitary increments (e.g., 1 day increments) using the gestural box. In response to the adjusting, the graphical overlay kinetically refreshes by updating only the objects that have schedule attributes that are impacted by the adjustment. For example, objects or attributes that are impacted are those that change in value or time position due to the adjustment. If any objects that were displayed according to the second, different format (here the thicker bars), but now have schedule attributes that fall outside the one or more filter criteria due to the adjustment or the updating, the display format of those objects are then changed to display according to a third display format, which is different than the second display format and may be the same or different than the first default display format. However, in the example in FIG. 15, upon crashing the subject activity duration by only one day, the duration still falls inside the filter criteria and thus the activity is still displayed with thicker bars.

In the example in FIG. 16, further crashing the duration of the Shops, R&A, Delivery activity by one additional day does still does not recover schedule. However, in the example in FIG. 17, a third day of shortening instantly causes all previous activities that were behind schedule and that were previously displayed with thicker bars to kinetically refresh and display according to the third display format, which in this example are faded bars. The third display format (here the faded bars) provides an immediate visual feedback to the user that those activities are back on schedule. The what-if revisions implemented thus eliminate the negative variance starting from the earmarked activity so that the schedule completes on time, even though preceding activities such as Bid/Award Steel remain with negative variance.

In another example, if a set of postulated revisions does not accomplish the intended schedule recovery they can be reversed using the undo feature, and other what-if revisions pursued.

Because the filter-based method enables activities to kinetically refresh instantly upon reaching a variance threshold, there is immediate feedback to the user of whether any postulated what-if revisions accomplish a given goal, which provides much more rapid feedback than approaches using CPM applications that require multiple input/calculations/output batches and scrolling or flipping through pages to ascertain the result of the revisions attempted.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for interactively transforming a schedule display, comprising:
   (a) providing a baseline schedule of networked schedule objects and a related target schedule, wherein each of the baseline schedule and the target schedule has schedule attributes that include at least one of start date, finish date, duration, drift, float, or total float;
   (b) selecting one or more filter criteria and comparing one or more of the schedule attribute variances between the baseline schedule and the target schedule against the one or more filter criteria;
   (c) displaying the baseline schedule on a canvas with the target schedule as a graphical overlay, wherein any of the networked schedule objects that have schedule attributes that fall outside the one or more filter criteria are displayed according to a first, default display format and any of the networked schedule objects that have schedule attributes that fall inside the one or more filter criteria are displayed according to a second, different display format;
   (d) on the graphical overlay, adjusting at least one of the schedule attributes such that one or more of the schedule attributes in said step (c) that fell inside the one or more filter criteria now falls outside the one or more filter criteria; and
   (e) in response to the adjusting of the one or more attributes, kinetically refreshing the graphical overlay by:
   updating any of the schedule attributes that are impacted by the adjusting of the one or more schedule attributes, and
   changing the networked schedule objects that were displayed in said step (c) according to the second, different display format, but that now have schedule attributes that fall outside the one or more filter criteria due to the adjusting or the updating, to display according to a third display format that is different than the second display format.

2. The method as recited in claim 1, wherein the first, default display format and the second display format differ from each other in at least one of color, pattern, or size.

3. The method as recited in claim 1, wherein the first, default display format includes a first bar thickness and the second, different display format includes a second bar thickness different than the first bar thickness.

4. The method as recited in claim 1, wherein the first, default display format includes a first bar color and the second, different display format includes a second bar color different than the first bar color.

5. The method as recited in claim 1, wherein the second display format is different from the third display format with respect to at least bar thickness.

6. The method as recited in claim 1, wherein the adjusting of the at least one of the schedule attributes includes incrementally changing the at least one of the schedule attributes on the graphical overlay until one or more of the schedule attributes in said step (c) that fell inside the one or more filter criteria falls outside the one or more filter criteria.

7. The method as recited in claim 1, wherein the updating is only of the schedule attributes that are changed by the adjusting of the one or more schedule attributes.

8. The method as recited in claim 1, wherein the one or more filter criteria is determinative of a behind-schedule status, an ahead-of-schedule status, or an on-schedule status.

9. The method as recited in claim 1, wherein the graphical overlay is continuously displayed during said steps (d) and (e).

10. A computer application encoded in non-transitory computer-readable media for interactively transforming a schedule display, the computer application comprising instructions operable when executed to:
  (a) provide a baseline schedule of networked schedule objects and a related target schedule, wherein each of the baseline schedule and the target schedule has schedule attributes that include at least one of start date, finish date, duration, drift, float, or total float;
  (b) select one or more filter criteria and compare one or more schedule of the schedule attribute variances between the baseline schedule and the target schedule against the one or more filter criteria;
  (c) display the baseline schedule on a canvas with the target schedule as a graphical overlay, wherein any of the networked schedule objects that have schedule attributes that fall outside the one or more filter criteria are displayed according to a first, default display format and any of the networked schedule objects that have schedule attributes that fall inside the one or more filter criteria are displayed according to a second, different display format;
  (d) on the graphical overlay, adjust at least one of the schedule attributes such that one or more of the schedule attributes in said step (c) that fell inside the one or more filter criteria now falls outside the one or more filter criteria; and
  (e) in response to the adjustment of the one or more attributes, kinetically refresh the graphical overlay by:
  updating any of the schedule attributes that are impacted by the adjusting of the one or more schedule attributes, and
  changing the networked schedule objects that were displayed in said step (c) according to the second, different display format, but that now have schedule attributes that fall outside the one or more filter criteria due to the adjusting or the updating, to display according to a third display format that is different than the second display format.

11. A system for interactively transforming a schedule display, comprising:
  a screen display operable to provide a graphical user interface; and
  one or more processor modules operable to:
  (a) provide a baseline schedule of networked schedule objects and a related target schedule, wherein each of the baseline schedule and the target schedule has schedule attributes that include at least one of start date, finish date, duration, drift, float, or total float;
  (b) enable selection of one or more filter criteria and compare one or more of the schedule attribute variances between the baseline schedule and the target schedule against the one or more filter criteria;
  (c) display the baseline schedule on a canvas on the screen display with the target schedule as a graphical overlay, wherein any of the networked schedule objects that have schedule attributes that fall outside the one or more filter criteria are displayed according to a first, default display format and any of the networked schedule objects that have schedule attributes that fall inside the one or more filter criteria are displayed according to a second, different display format;
  (d) on the graphical overlay on the screen display, enable adjustment of at least one of the schedule attributes such that one or more of the schedule attributes in said step (c) that fell inside the one or more filter criteria now falls outside the one or more filter criteria; and
  (e) in response to the adjustment of the one or more attributes, kinetically refresh the graphical overlay on the screen display by:
  updating any of the schedule attributes that are impacted by the adjusting of the one or more schedule attributes, and
  changing the networked schedule objects that were displayed on the screen display in said step (c) according to the second, different display format, but that now have schedule attributes that fall outside the one or more filter criteria due to the adjusting or the updating, to display on the screen display according to a third display format that is different than the second display format.

\* \* \* \* \*